(12) United States Patent
Suzuki

(10) Patent No.: US 6,178,996 B1
(45) Date of Patent: Jan. 30, 2001

(54) FLOW RATE CONTROL APPARATUS

(75) Inventor: Isao Suzuki, Tokyo (JP)

(73) Assignee: MKS Japan, Inc., Tokyo (JP)

( * ) Notice: Under 35 U.S.C. 154(b), the term of this patent shall be extended for 0 days.

(21) Appl. No.: 09/474,016

(22) Filed: Dec. 28, 1999

(30) Foreign Application Priority Data

Dec. 28, 1998 (JP) ................................................ 10-374614

(51) Int. Cl.$^7$ .................................................. F16K 31/42
(52) U.S. Cl. ...................... 137/487.5; 137/486; 137/488; 137/334; 251/57
(58) Field of Search ................................ 137/487.5, 486, 137/488, 489.5, 492, 334; 251/57, 335.2, 335.3

(56) References Cited

U.S. PATENT DOCUMENTS

| | | | |
|---|---|---|---|
| 5,549,137 | * | 8/1996 | Lenz et al. ............................ 137/486 |
| 5,678,601 | * | 10/1997 | Engel .................................... 137/486 |
| 5,678,803 | * | 10/1997 | Shinohara et al. . | |
| 5,931,186 | * | 8/1999 | Skoglund ............................. 137/488 |

* cited by examiner

Primary Examiner—Gregory L. Huson
Assistant Examiner—Ramesh Krishnamurthy
(74) Attorney, Agent, or Firm—Wenderoth, Lind & Ponack, L.L.P.

(57) ABSTRACT

An actuator utilizing the pressure of a gas is used to operate a diaphragm-operated control valve. An operating force generated by the actuator is varied by feeding and discharging a gas such as $N_2$ through a narrow metallic tube. This is conducted by remote control, by means of electromagnetic valves provided in an environment at room temperature. The state of the control valve is monitored by a flow rate sensor which detects an actual flow rate of a fluid being controlled. Based on a signal representative of the detected actual flow rate, the electromagnetic valves for the actuator are controlled so that the fluid always flows at a desired flow rate. The gas such as $N_2$ is heated by a heat exchanger in a high-temperature atmosphere in the vicinity of the actuator, to thereby prevent cooling of the fluid being controlled.

9 Claims, 3 Drawing Sheets

FLOW RATE CONTROL APPARATUS

BACKGROUND OF THE INVENTION

The present invention relates to a fluid flow control apparatus for use in, for example, supplying a process gas for manufacturing semiconductors.

In a process for manufacturing semiconductors, there has been an increasing demand for a flow rate control apparatus for gasifying a liquid or solid material at a high temperature and feeding the resultant gas in a stable manner.

The above-mentioned flow rate control apparatus is used in a high-temperature environment of 100° C. or more. Therefore, as a control valve for the above-mentioned flow rate control apparatus, an electromagnetic valve adapted for use at a high temperature has been conventionally used. However, even in the electromagnetic valve adapted for use at a high-temperature, the heat-resistance of a coil is limited, so that a usable maximum temperature for the electromagnetic valve is about 200° C. Further, many materials used for manufacturing semiconductors are chemically reactive. Therefore, a diaphragm-operated control valve has been strongly desired.

However, in a diaphragm-operated control valve, the actuator for the valve is required to generate a force as large as 10 kg/cm$^2$ or more. Such a large force cannot be obtained when the actuator is an electromagnetic valve. Therefore, it is difficult to enable the use of a diaphragm-operated control valve by using an electromagnetic valve.

SUMMARY OF THE INVENTION

In view of the above situation regarding conventional flow rate control, the present invention has been made. It is an object of the present invention to provide a flow rate control apparatus which is usable at a temperature of 200° C. or more and which is capable of conducting flow rate control appropriately by movement of a diaphragm.

The present invention provides a flow rate control apparatus for controlling a fluid flow rate by controlling a degree of opening of an orifice through which a fluid flows. The flow rate control apparatus comprises: a control valve for controlling the degree of opening of the orifice by movement of a diaphragm which is operated by a pressure-operated valve actuator, tube feeds a pressure to the valve actuator from a position remote from the valve actuator, and a pressure control means arbitrarily controls the pressure to be fed to the valve actuator.

By this arrangement, when the control valve is placed in high temperature condition, the diaphragm is moved by means of the pressure-operated valve actuator so as to control the degree of opening of the orifice through which the fluid flows. Therefore, the desired flow rate control can be effected.

The present invention also provides a flow rate control apparatus for controlling a fluid flow rate by controlling a degree of opening of an orifice through which a fluid flows, the flow rate control apparatus comprising a control valve for controlling the degree of opening of the orifice by movement of a diaphragm which is operated by a pressure-operated valve actuator, a tube feeds a pressure to the valve actuator from a position remote from the valve actuator, a flow rate sensor detects an actual flow rate of the fluid under operation of the control valve, and a controlling part controls the pressure to be fed to the valve actuator so that an actual flow rate signal representative of the actual flow rate detected by the flow rate sensor coincides with a flow rate command signal externally applied to the controlling part.

In the flow rate control apparatus of the present invention, a heat exchanger may be provided at a portion of the tube for feeding the pressure to the valve actuator and the heat exchanger and the control valve may be placed in an atmosphere having the same temperature.

In the flow rate control apparatus of the present invention, the valve actuator may be operated by the application of the pressure of a gas and the flow rate control apparatus may include pressure control means having at least one control valve for feeding the gas to the valve actuator and discharging the gas therefrom.

In the flow rate control apparatus of the present invention, the valve actuator may be operated by the application of liquid pressure and the flow rate control apparatus may include pressure control means having a liquid pump for generating the liquid pressure.

The foregoing and other objects, features and advantages of the present invention will be apparent from the following detailed description and appended claims taken in connection with the accompanying drawings.

DETAILED DESCRIPTION OF THE INVENTION

Figure 1:
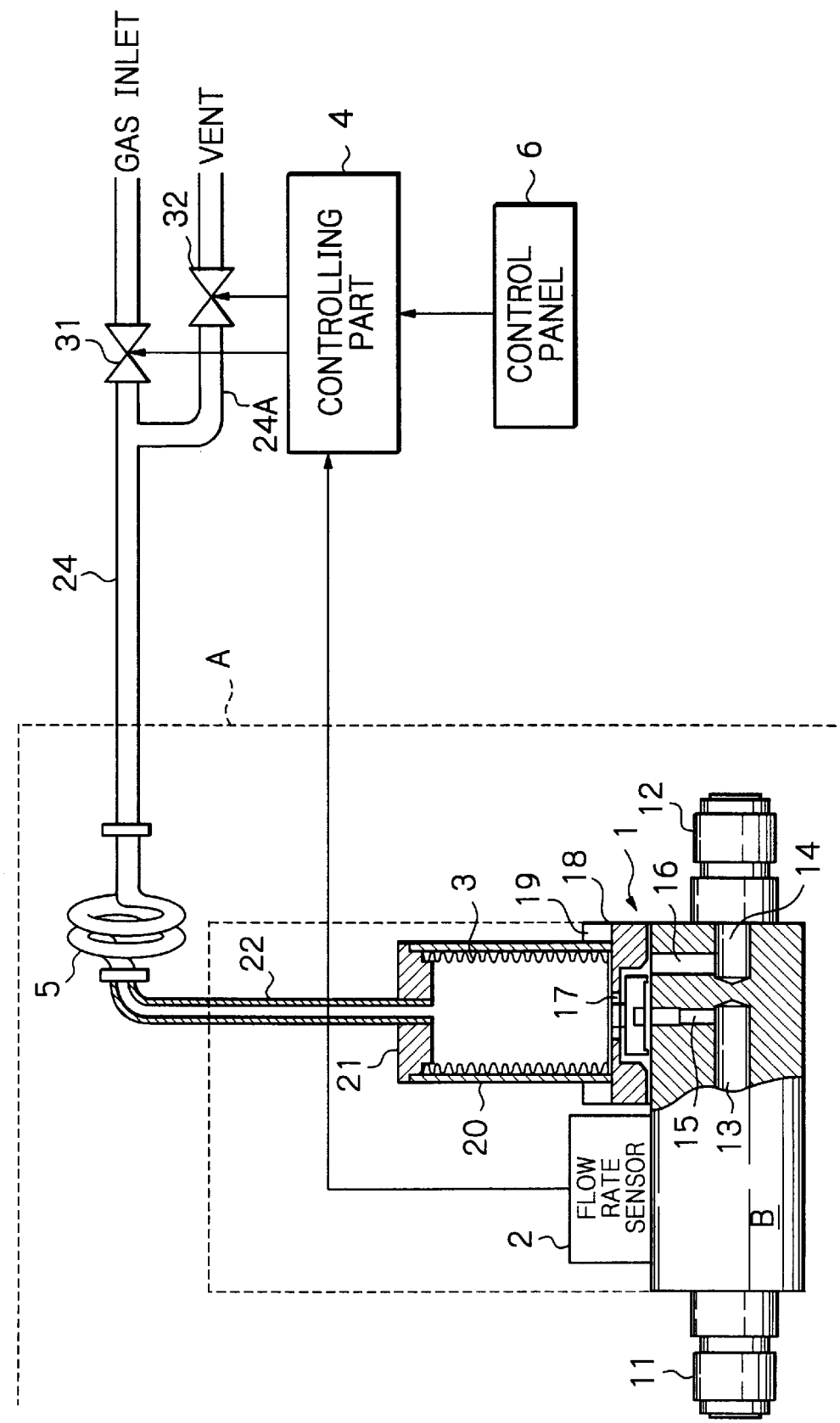
FIG. 1 is a view showing an arrangement of a flow rate control apparatus according to a first embodiment of the present invention.
Figure 2:
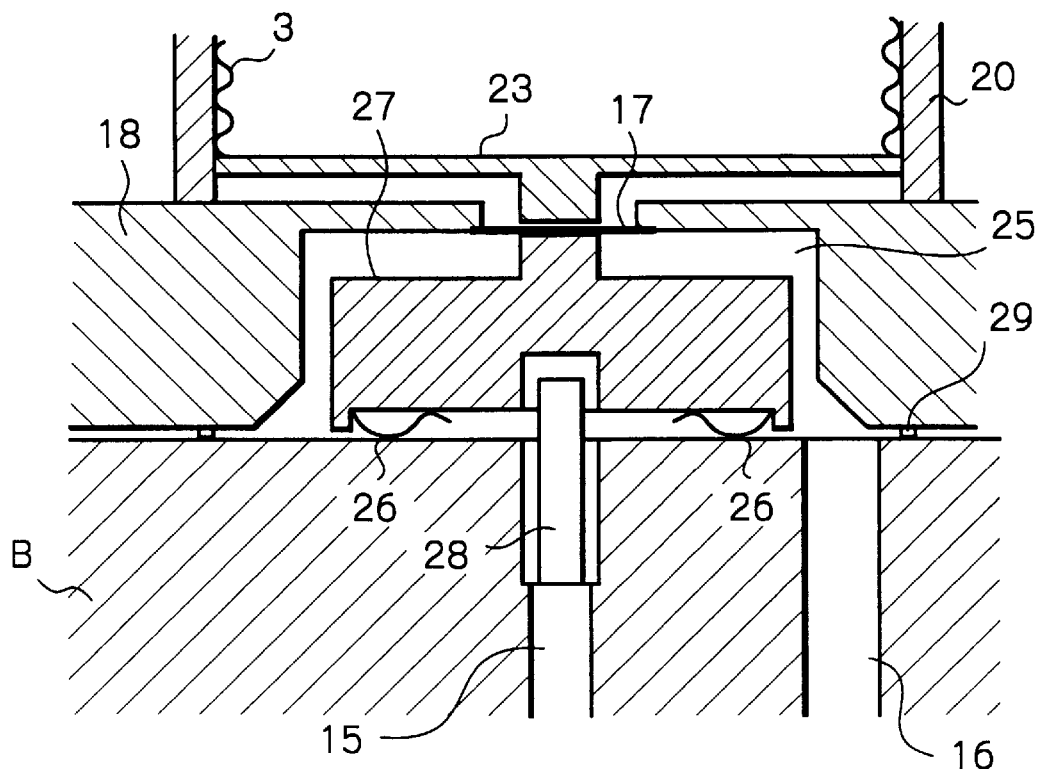
FIG. 2 is a cross-sectional view of an essential part of the flow rate control apparatus according to the first embodiment of the present invention.

Hereinbelow, referring to the accompanying drawings, description is made in detail with respect to a flow rate control apparatus of the present invention. In the drawings, the same elements are designated by the same reference numerals and characters, and overlapping explanation is omitted. FIG. 1 shows an arrangement of a flow rate control apparatus according to a first embodiment of the present invention. FIG. 2 is an enlarged view of an essential part of the flow rate control apparatus of FIG. 1. This apparatus comprises a control valve 1 for controlling a flow rate of a fluid, a flow rate sensor 2, a valve actuator including bellows 3 and a controlling part 4.

The control valve 1 comprises a rectangular parallelepiped-like base B and an inlet fitting 11 and an outlet fitting 12 connected to the base B. A gas being controlled is fed from a pipe connected to the inlet fitting 11 into the base B and discharged from the base B through a pipe connected to the outlet fitting 12. The base B includes a lateral passage 13 on the inlet side where process gas comes in and a lateral passage 14 from which process gas goes out. Vertical channels 15 and 16 are formed in the base B so as to extend from respective ends of the lateral channels 13 and 14.

A flange 18 having a diaphragm 17 is placed on a surface of the base B where the vertical channels 15 and 16 are formed. A cylinder 20 supported by a frame 19 stands on the flange 18. The cylinder 20 and the flange 18 are fixed to the base B by means of screws threadably engaged with threaded bores formed in the frame 19. A space between the flange 18 and the base B is sealed with an 0-ring 29.

Figure 3:
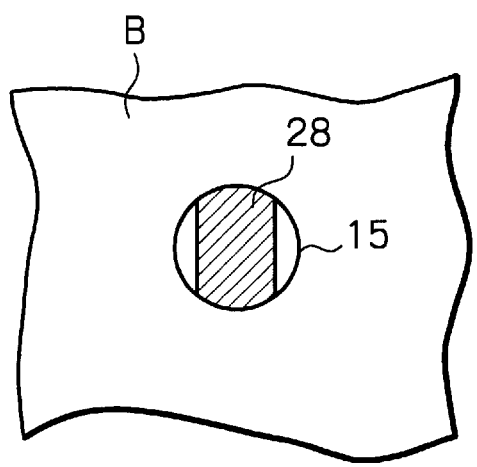
FIG. 3 is a cross-sectional view of an essential part of the flow rate control apparatus according to the first embodiment of the present invention.

The flange 18 is in a disk-like form including a large recess facing the base B. This recess includes a through-hole formed at a central portion thereof so that the diaphragm 17 extends over the through-hole. The recess provides a valve chamber 25. The valve chamber 25 accommodates a valve head 27. The valve head 27 has a protrusion on a surface thereof facing the diaphragm 17 and a shallow recess adapted to receive leaf springs 26 on the other surface. A bore into which a positioning shaft 28 is inserted is formed at a central portion of the shallow recess. FIG. 3 is a cross-sectional view of the shaft 28, taken on the surface of the base B. As shown in FIG. 3, the shaft 28 is in a form obtained by cutting a side of a cylindrical rod from two directions by means of a cutting tool. The shaft 28 is inserted into the vertical channel 15 to reach a stepped portion of the base B so that the fluid flows through the gaps between the cut portions of the shaft 28 and the vertical channel 15.

A tube 22 is connected to a central portion of a cover 21 for the cylinder 20. A gas such as $N_2$ is fed from the tube 22 into the cylinder 20. The cylinder 20 contains the bellows 3, which is closed by a movable plate 23 on a side of the flange 18. The gas such as $N_2$ is fed under pressure a from a gas supply source (not shown) through an electromagnetic valve 31 to a tube 24. Further, the gas such as $N_2$ is released from a branch tube 24A of the tube 24 through an electromagnetic valve 32.

A heat exchanger 5 is provided between the tube 24 and the tube 22. A broken line A indicates a boundary between two atmospheres. A side of the control valve 1 relative to the broken line A is an atmosphere having a high temperature, and a side of the controlling part 4 relative to the broken line A is an atmosphere at room temperature. Since the heat exchanger 5 is placed in the high-temperature atmosphere, the gas such as $N_2$ for operation is heated due to heat exchange before it enters the bellows 3. Therefore, there is no possibility that the process gas being controlled will be cooled through the movable plate 23 and the diaphragm 17 when it passes through the valve chamber 25.

The flow rate sensor 2 detects an actual flow rate of the fluid being controlled, and an actual flow rate signal representative of the detected actual flow rate is applied to the controlling part 4. A flow rate command signal inputted from a control panel 6 is also applied to the controlling part 4. Based on the actual flow rate signal from the flow rate sensor 2 and the flow rate command signal from the control panel 6, the controlling part 4 controls the electromagnetic valves 31 and 32. The electromagnetic valve 32 is opened when releasing of the gas such as $N_2$ becomes necessary.

In the flow rate control apparatus arranged as mentioned above, in a non-operating state, the electromagnetic valve 31 is open and the electromagnetic valve 32 is closed. The movable plate 23 for the bellows 3 presses the valve head 27 together with the diaphragm 17 to thereby prevent flow of the gas being controlled. When the flow rate command signal is inputted from the control panel 6, the electromagnetic valve 31 is closed and the electromagnetic valve 32 is opened, to thereby lower the pressure in the bellows 3. Consequently, the valve head 27 is lifted by the force of the leaf springs 26, to thereby permit flow of the process gas being controlled through the control valve 1. This state is maintained under control of the controlling part 4 until the actual flow rate represented by the actual flow rate signal from the flow rate sensor 2 coincides with flow rate command signal from the control panel 6. When the actual flow rate becomes coincident with the commanded flow rate, the electromagnetic valve 32 is closed. When the actual flow rate exceeds the commanded flow rate, the controlling part 4 slightly opens the electromagnetic valve 31 and the movable plate 23 for the bellows 3 presses the valve head 27 together with the diaphragm 17, to thereby suppress the flow of the gas being controlled. That is, a degree of opening of an orifice formed by the valve head 27 and the base B is varied under control of the controlling part 4 so that the fluid flow rate equal to the commanded flow rate can be obtained. The bellows 3 is advantageous in that it is capable of generating a sufficiently large force in proportion to a bottom area thereof and is suitable for use under high temperature conditions as compared to an electromagnetic valve.

Figure 4:
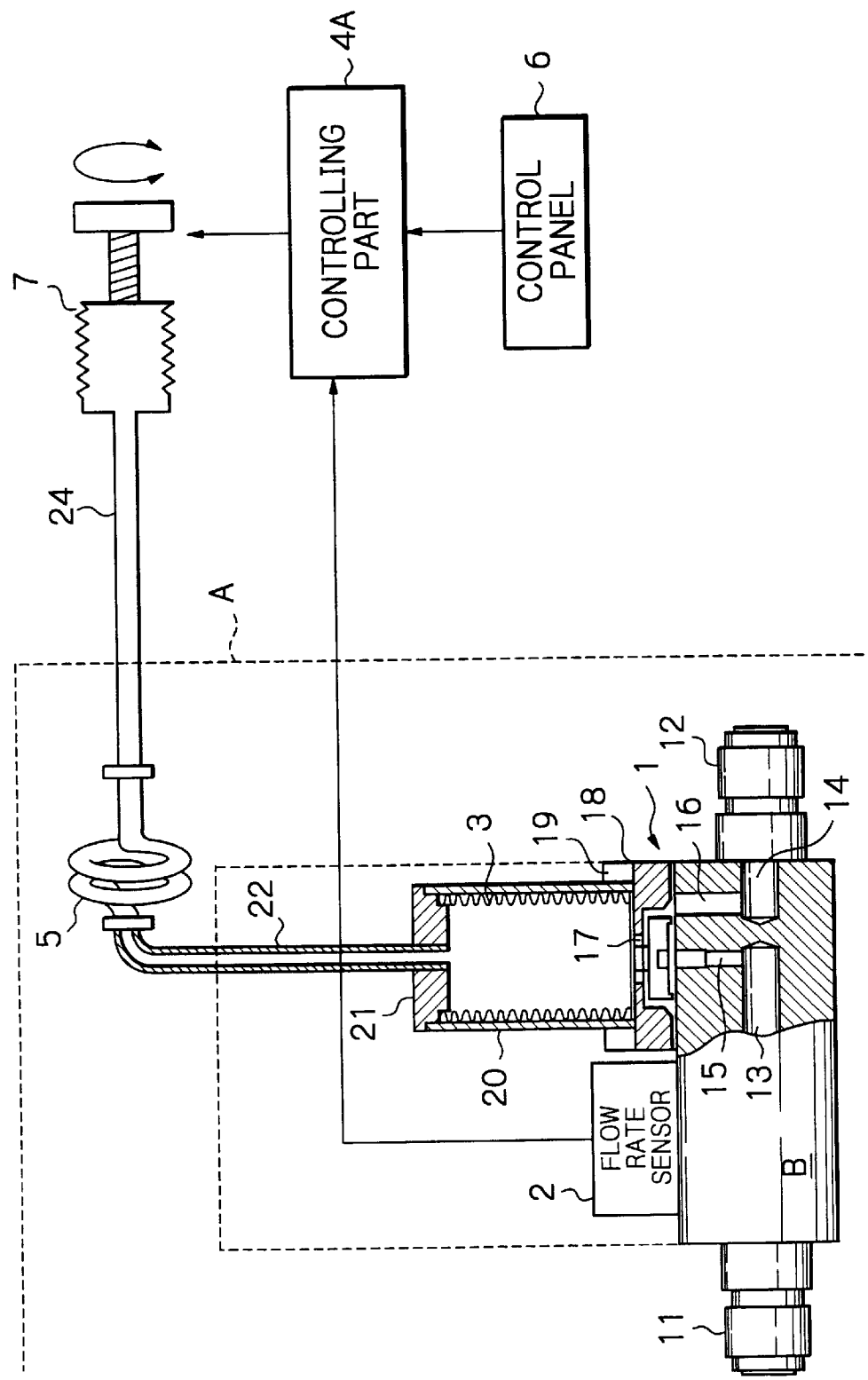
FIG. 4 is a view showing an arrangement of a flow rate control apparatus according to a second embodiment of the present invention.

FIG. 4 shows an arrangement of a flow rate control apparatus according to a second embodiment of the present invention. In this embodiment, the tube 24 is connected to a pump 7. A fluid passage from the pump 7 to the bellows 3 through the tube 24, the heat exchanger 5 and the tube 22 is filled with a liquid, and a controlling part 4A controls the liquid by application of pressure in the pump 7. (As an example of the above-mentioned liquid, for use in an atmosphere having a high temperature, oil adapted for use at a high temperature is used.)

For example, in a non-operating state of the apparatus, the controlling part 4A applies pressure to the liquid by means of the pump 7 so that the control valve 1 is closed. When the commanded flow rate signal is inputted from the control panel 6, the pressure applied by the pump 7 is lowered, and control of the pressure of the pump 7 is effected so that the actual flow rate signal from the flow rate sensor 2 coincides with the commanded flow rate signal from the control panel 6.

Thus, in this embodiment, the valve actuator is operated by application of liquid pressure, leading to a fast response time as compared to application of pressure of a gas. However, when the control valve 1 is provided in a high-temperature atmosphere, a liquid having no air bubbles generated at a high temperature should be used as the liquid for application of pressure.

In the above-mentioned two embodiments, the heat exchanger 5 is used. However, the heat exchanger may be unnecessary, depending on the type of the apparatus. Further, the control valve I may be of a normally open type or of a normally closed type.

As has been described above, in the flow rate control apparatus of the present invention, the diaphragm is moved by means of the pressure-operated valve actuator so as to control the degree of opening of the orifice through which the fluid flows. Therefore, it is possible to effect desired flow rate control by moving the diaphragm with sufficiently large force.

Further, there are no components damaged by heat in the valve actuator and an operation at a temperature over 200° C. become possible.

Further, in the flow rate control apparatus of the present invention further comprising a tube for feeding pressure to the valve actuator and a heat exchanger provided at a portion of the tube, wherein the heat exchanger and the control valve are placed in an atmosphere having the same temperature, the diaphragm can be moved at a temperature equal to that in an area in the vicinity of the valve actuator due to the effect of heat exchange. Therefore, it is possible to suppress any thermal effect on the fluid being controlled, even though the fluid control valve is located in a high temperature atmosphere and is driven through a pipe by a pressure control valve which is located under room temperature conditions.

What is claimed is:

1. A flow rate control apparatus for controlling a fluid flow rate by controlling a degree of opening of an orifice through which the fluid flows, the flow rate control apparatus comprising:
   a control valve for controlling the degree of opening of the orifice by movement of an operably connected diaphragm which is operated by a pressure-operated valve actuator;
   a tube for applying a pressure to the valve actuator from a position remote from the valve actuator;
   a pressure control means for controlling the pressure to be applied to the valve actuator; and
   a heat exchanger provided at a portion of the tube for applying the pressure to the valve actuator;
   wherein the heat exchanger and the control valve are placed in an atmosphere having the same temperature.

2. The flow rate control apparatus of claim 1, wherein the valve actuator is operated by the application of the pressure of a gas and wherein the pressure control means has at least one control valve for feeding the gas to the valve actuator and discharging the gas therefrom.

3. The flow rate control apparatus of claim 1, wherein the valve actuator is operated by the application of liquid pressure and wherein the pressure control means has a liquid pump for generating the liquid pressure.

4. A flow rate control apparatus for controlling a fluid flow rate by controlling a degree of opening of an orifice through which the fluid flows, the flow rate control apparatus comprising:
   a control valve for controlling the degree of opening of the orifice by movement of an operably connected diaphragm which is operated by a pressure-operated valve actuator;
   a tube for applying a pressure to the valve actuator from a position remote from the valve actuator;
   a flow rate sensor for detecting an actual flow rate of the fluid under control of the control valve;
   a controlling part for controlling the pressure to be applied to the valve actuator so that an actual flow rate signal representative of the actual flow rate detected by the flow rate sensor coincides with a flow rate command signal externally applied to the controlling part; and
   a heat exchanger provided at a portion of the tube for applying the pressure to the valve actuator;
   wherein the heat exchanger and the control valve are placed in an atmosphere having the same temperature.

5. The flow rate control apparatus of claim 4, wherein the valve actuator is operated by the application of the pressure of a gas and wherein the controlling part has at least one control valve for feeding the gas to the valve actuator and discharging the gas therefrom.

6. The flow rate control apparatus of claim 4, wherein the valve actuator is operated by the application of liquid pressure and wherein the controlling part has a liquid pump for generating the liquid pressure.

7. A flow rate control apparatus for controlling a fluid flow rate by controlling a degree of opening of an orifice through which the fluid flows, the flow rate control apparatus comprising:
   a control valve for controlling the degree of opening of the orifice by movement of an operably connected diaphragm which is operated by a pressure-operated valve actuator;
   a tube for applying a pressure to the valve actuator from a position remote from the valve actuator;
   a controlling part for controlling the pressure to be applied to the valve actuator; and
   a heat exchanger provided at a portion of the tube for applying the pressure to the valve actuator;
   wherein the heat exchanger and the control valve are placed in an atmosphere having the same temperature.

8. The flow rate control apparatus of claim 7, wherein the valve actuator is operated by the application of the pressure of a gas and wherein the controlling part has at least one control valve for feeding the gas to the valve actuator and discharging the gas therefrom.

9. The flow rate control apparatus of claim 7, wherein the valve actuator is operated by the application of liquid pressure and wherein the controlling part has a liquid pump for generating the liquid pressure.

* * * * *